United States Patent
Miyata et al.

(10) Patent No.: US 10,233,401 B2
(45) Date of Patent: Mar. 19, 2019

(54) CHAR FEEDING HOPPER, CHAR RECOVERY SYSTEM, AND COAL GASIFICATION COMBINED POWER GENERATION SYSTEM

(71) Applicant: MITSUBISHI HITACHI POWER SYSTEMS, LTD., Yokohama-shi (JP)

(72) Inventors: Yasuyuki Miyata, Tokyo (JP); Yoshinori Koyama, Tokyo (JP); Yasuo Soda, Tokyo (JP); Junichiro Yamamoto, Tokyo (JP); Koji Nishimura, Tokyo (JP); Naoto Nakayama, Tokyo (JP)

(73) Assignee: MITSUBISHI HITACHI POWER SYSTEMS, LTD., Yokohama-Shi (JP)

(*) Notice: Subject to any disclaimer, the term of this patent is extended or adjusted under 35 U.S.C. 154(b) by 345 days.

(21) Appl. No.: 15/027,321

(22) PCT Filed: Sep. 12, 2014

(86) PCT No.: PCT/JP2014/074331
§ 371 (c)(1),
(2) Date: Apr. 5, 2016

(87) PCT Pub. No.: WO2015/068469
PCT Pub. Date: May 14, 2015

(65) Prior Publication Data
US 2016/0237358 A1 Aug. 18, 2016

(30) Foreign Application Priority Data
Nov. 8, 2013 (JP) .................. 2013-232439

(51) Int. Cl.
*C10J 3/72* (2006.01)
*G01F 23/288* (2006.01)
*C10J 3/50* (2006.01)

(52) U.S. Cl.
CPC .............. *C10J 3/72* (2013.01); *C10J 3/506* (2013.01); *G01F 23/288* (2013.01);
(Continued)

(58) Field of Classification Search
CPC .............. C10J 2300/094; C10J 2200/15; C10J 2300/1693; G01F 23/288
See application file for complete search history.

(56) References Cited

U.S. PATENT DOCUMENTS 3,582,647 A * 6/1971 Figuet ................... G01N 23/12
250/358.1
3,784,359 A * 1/1974 Parth ...................... G01N 31/12
422/79
(Continued)

FOREIGN PATENT DOCUMENTS

| CN | 102107108 | 6/2011 |
| CN | 201945357 | 8/2011 |

(Continued)

OTHER PUBLICATIONS

Office Action dated Mar. 3, 2017 in corresponding Chinese Application No. 201480052730.4, with English Translation.
(Continued)

*Primary Examiner* — Imran Akram
(74) *Attorney, Agent, or Firm* — Wenderoth, Lind & Ponack, L.L.P.

(57) ABSTRACT

Provided are a char feeding hopper that makes it possible to accurately measure char, a char recovery system, and a coal gasification combined power generation system. The char feeding hopper comprises: a char feeding hopper body that feeds separated char to a coal gasifier side; at least two casing tubes (121, 122) that are inserted from a side wall of the char feeding hopper body and that are provided so as to be aligned with one another in the vertical axis direction; a
(Continued)

radiation source section (101) that is provided within the casing tube (121) and that emits γ-rays within the char feeding hopper body; and a γ-ray detector that is provided within the casing tube (122) and that detects emitted γ-rays. The cross-section of each casing tube (121, 122) has a shape that is provided with a tapered section (200) having an apex angle on the upper edge thereof.

3 Claims, 6 Drawing Sheets

(52) U.S. Cl.
CPC ....... *G01F 23/2885* (2013.01); *C10J 2200/15* (2013.01); *C10J 2200/156* (2013.01); *C10J 2300/093* (2013.01); *C10J 2300/094* (2013.01); *C10J 2300/0956* (2013.01); *C10J 2300/1653* (2013.01); *C10J 2300/1671* (2013.01); *C10J 2300/1678* (2013.01); *C10J 2300/1693* (2013.01); *C10J 2300/1807* (2013.01); *Y02E 20/18* (2013.01)

(56) References Cited

U.S. PATENT DOCUMENTS

| | | | | |
|---|---|---|---|---|
| 4,462,319 A | * | 7/1984 | Larsen | A62C 31/22 110/238 |
| 5,127,772 A | * | 7/1992 | Dewitz | B01J 8/1809 406/90 |
| 5,132,917 A | * | 7/1992 | Bass | C10J 3/723 406/10 |
| 6,330,789 B2 | * | 12/2001 | Onoda | F02C 3/28 60/39.12 |
| 2002/0166412 A1 | * | 11/2002 | Choi | C21B 13/002 75/444 |
| 2004/0211345 A1 | * | 10/2004 | Okazaki | F23C 6/045 110/261 |
| 2010/0302089 A1 | | 12/2010 | Nistor et al. | |
| 2014/0250786 A1 | | 9/2014 | Koyama et al. | |

FOREIGN PATENT DOCUMENTS

| | | |
|---|---|---|
| JP | 9-166472 | 6/1997 |
| JP | 2007-271477 | 10/2007 |
| JP | 2009-256090 | 11/2009 |
| JP | 2013-57048 | 3/2013 |
| WO | 2013/024827 | 2/2013 |

OTHER PUBLICATIONS

International Search Report dated Oct. 21, 2014 in corresponding International Application No. PCT/JP2014/074331.

Written Opinion of the International Searching Authority dated Oct. 21, 2014 in corresponding International Application No. PCT/JP2014/074331.

* cited by examiner

CHAR FEEDING HOPPER, CHAR RECOVERY SYSTEM, AND COAL GASIFICATION COMBINED POWER GENERATION SYSTEM

TECHNICAL FIELD

The present invention relates to a char feeding hopper, a char recovery system, and a coal gasification combined power generation system, and particularly, to a char feeding hopper, a char recovery system, and a coal gasification combined power generation system capable of accurately measuring char.

BACKGROUND ART

A carbonaceous feedstock gasification system is a system which converts a carbonaceous feedstock into gas mainly containing CO, $N_2$, or the like by gasifying agent containing oxygen or water vapor. In general, the carbonaceous feedstock gasification system is configured of a carbonaceous feedstock feeding system, a gasifier, and a char recovery system. The carbonaceous feedstock is fed to the gasifier by transport gas such as nitrogen, the gasifying agent (air, oxygen-enriched air, oxygen, water vapor, or like) is fed to the gasifier, the carbonaceous feedstock is combustion-gasified in the gasifier, and product gas (combustible gas) is generated. In addition, in the char recovery system, an unreacted portion (char) of a carbon-containing feedstock of the product gas is removed.

In the char recovery system in the above-described gasification system of the carbonaceous feedstock, the char contained in the product gas generated by the gasifier is removed using a plurality of stages of separation. In addition, the recovered char is returned to the gasifier by the char feeding unit. As the char feeding unit, a char feeding hopper is installed. When the recovered char is re-input to the gasifier, it is necessary to control an operation such that a recovery amount of the char and a feed amount of the char approximately balance with each other. Accordingly, it is important to correctly grasp the amount of retained char.

For example, PTL 1 discloses that a volume (level) inside a hopper is measured using a radiation source section and a γ-ray detector provided inside the casing tube.

CITATION LIST

Patent Literature

[PTL 1]Japanese Unexamined Patent Application Publication No. 2013-57048

SUMMARY OF INVENTION

Technical Problem

However, in the invention disclosed in PTL 1, since the casing tube having the radiation source section and the γ-ray detector in the inner portion is formed in a tubular shape, there is a problem that char is accumulated in the casing tube.

When the level of the char stored in the char feeding hopper moves the upper portion of the casing tube to the lower portion, the char may accumulate on the upper portion of the casing tube. In this case, even when the amount of the char is small in actual, it is erroneously measured that the char is stored to the upper portion of the casing tube, or the like, and the char accumulated on the upper portion of the casing tube inhibits a correct volume measurement. Accordingly, it is not possible to correctly grasp the amount of the retained char, a fixed feeding amount of the char is not performed, and a stable operation is difficult. In addition, stopping of gasifier may occur.

The present invention is made in consideration of the above-described circumstances, and an object thereof is to provide a char feeding hopper, a char recovery system, and a coal gasification combined power generation system capable of correctly measuring char.

Solution to Problem

In order to solve the problems, a char feeding hopper, a char recovery system, and a coal gasification combined power generation system of the present invention adopt the following means.

According to a first aspect of the present invention, there is provided a char feeding hopper, comprising: a char feeding hopper body which feeds separated char to a gasifier side; at least two casing tubes which are inserted from a side wall of the char feeding hopper body and are provided so as to be aligned with each other in a vertical axis direction; a radiation source section which is provided within one of at least the two casing tubes and emits γ-rays to the inner portion of the char feeding hopper body; and a γ-ray detector which is provided within the other of at least the two casing tubes and detects the emitted γ-rays, wherein a cross-section of each casing tube has a shape which is provided with a tapered section having an apex angle on the upper edge of the casing tube.

In the casing tube, the radiation source section having a radiation source emitting a γ-ray and the γ-ray detector detecting the γ-ray are installed as a level gauge for detecting a powder layer level inside the char feeding hopper. The γ-ray is emitted from the radiation source section toward the γ-ray detector, and when the γ-ray enters the γ-ray detector, electrical signals are generated and detected. In addition, the powder layer level of the char is measured using a density difference generated by transmission of the γ-ray according to the amount of the char.

When the amount of the char accumulated in the char feeding hopper and the upper surface of the accumulated char moves the upper portion of the casing tube to the lower portion, the char may remain on the upper portion of the casing tube to be accumulated. In this case, even when the amount of the char is small in actual, it is erroneously measured that the char is stored to the upper portion of the casing tube, or the like, and the char accumulated in the char feeding hopper inhibits a correct volume measurement. Accordingly, it is not possible to correctly grasp the amount of the retained char, a fixed feeding amount of the char is not performed, and a stable operation is difficult. In addition, stopping of the gasifier may occur.

Therefore, the cross-section of the casing tube has a shape which is provided with a tapered section having an apex angle on the upper edge of the casing tube. Accordingly, since the apex angle is provided on the upper edge of the casing tube, the char positioned on the upper portion of the casing tube cannot stay on the upper edge of the casing tube, and since the cross-section of the casing tube has a tapered shape, the char cannot stay on the casing tube and slides down. In this way, since it is possible to prevent the char from accumulating on the tapered section of the casing tube in advance, the measurement is not interrupted by the char, and a correct volume measurement can be performed. Accordingly, it is possible to continuously perform a stable operation.

In the first aspect, an angle between a horizontal surface and a side surface of the tapered section may be equal to or greater than a repose angle of the char.

According to the first aspect, since the angle between the horizontal surface and a side surface of the tapered section is equal to or greater than the repose angle when the char is accumulated, it is possible to prevent the char from accumulating on the side surface of the tapered section. Accordingly, a correct volume measurement is performed, and it is possible to continuously perform a stable operation.

According to a second aspect, there is provided a char feeding hopper, including: a char feeding hopper body which feeds separated char to a gasifier side; at least two casing tubes which are inserted from a side wall of the char feeding hopper body and are provided so as to be aligned with each other in a vertical axis direction; a radiation source section which is provided within one of at least the two casing tubes and emits γ-rays to the inner portion of the char feeding hopper body; a γ-ray detector which is provided within the other of at least the two casing tubes and detects the emitted γ-rays; and a char removing portion which removes char accumulated on an upper portion of the casing tube.

According to the second aspect, since the char accumulated on the upper portion of the casing tube can be removed by the char removing portion, it is possible to prevent the char from accumulating on the casing tube. Accordingly, a correct volume measurement is performed, and it is possible to continuously perform a stable operation.

In addition, even when the char is accumulated, it is possible to remove the char by the char removing portion.

In the second aspect, the char removing portion may include a nozzle which injects inert gas used in the gasifier.

According to the second aspect, since the char removing portion includes the nozzle which injects inert gas used in the gasifier, it is possible to remove the char accumulated on the casing tube by the injection of the inert gas. In addition, since the inert gas used in the gasifier is used, it is not necessary to provide new equipment for injecting gas, and the gas can be easily introduced. In addition, for example, as the inert gas, there is nitrogen ($N_2$), carbon dioxide ($CO_2$), or the like.

According to a third aspect of the present invention, there is provided a char feeding hopper, comprising: a char feeding hopper body which feeds separated char to a gasifier side; at least two casing tubes which are inserted from a side wall of the char feeding hopper body and are provided so as to be aligned with each other in a vertical axis direction; a radiation source section which is provided within one of at least the two casing tubes and emits γ-rays to the inner portion of the char feeding hopper body; and a γ-ray detector which is provided within the other of at least the two casing tubes and detects the emitted γ-rays, in which the casing tube is rotatable around a center axis.

According to the third aspect of the present invention, since the casing tube can rotate in the circumference direction in which the center axis is in the center, even when the char is accumulated on the upper portion of the casing tube, it is possible to slide down the char accumulated on the upper portion by rotating the casing tube, and it is possible to prevent the char from accumulating on the upper portion of the casing tube. Accordingly, a correct volume measurement is performed, and it is possible to continuously perform a stable operation.

In addition, even when the char is accumulated, it is possible to remove the char by the rotation of the casing tube.

According to a fourth aspect of the present invention, there is provided a char recovery system including the above-described char feeding hopper.

According to a fifth aspect of the present invention, there is provided a coal gasification combined power generation system including the above-described char recovery system.

Advantageous Effects of Invention

According to the present invention, since it is possible to prevent char from accumulating in a casing tube including a radiation source section and a γ-ray detector in the inner portion, it is possible to correctly grasp an amount of retained char, and it is possible to continuously perform a stable operation.

DESCRIPTION OF EMBODIMENTS

Hereinafter, embodiments of a char feeding hopper, a char recovery system, and a coal gasification combined power generation system according to the present invention will be described with reference the drawings.

[First Embodiment]

Hereinafter, a first embodiment of the present invention will be described with reference to FIG. 1.

Figure 1:
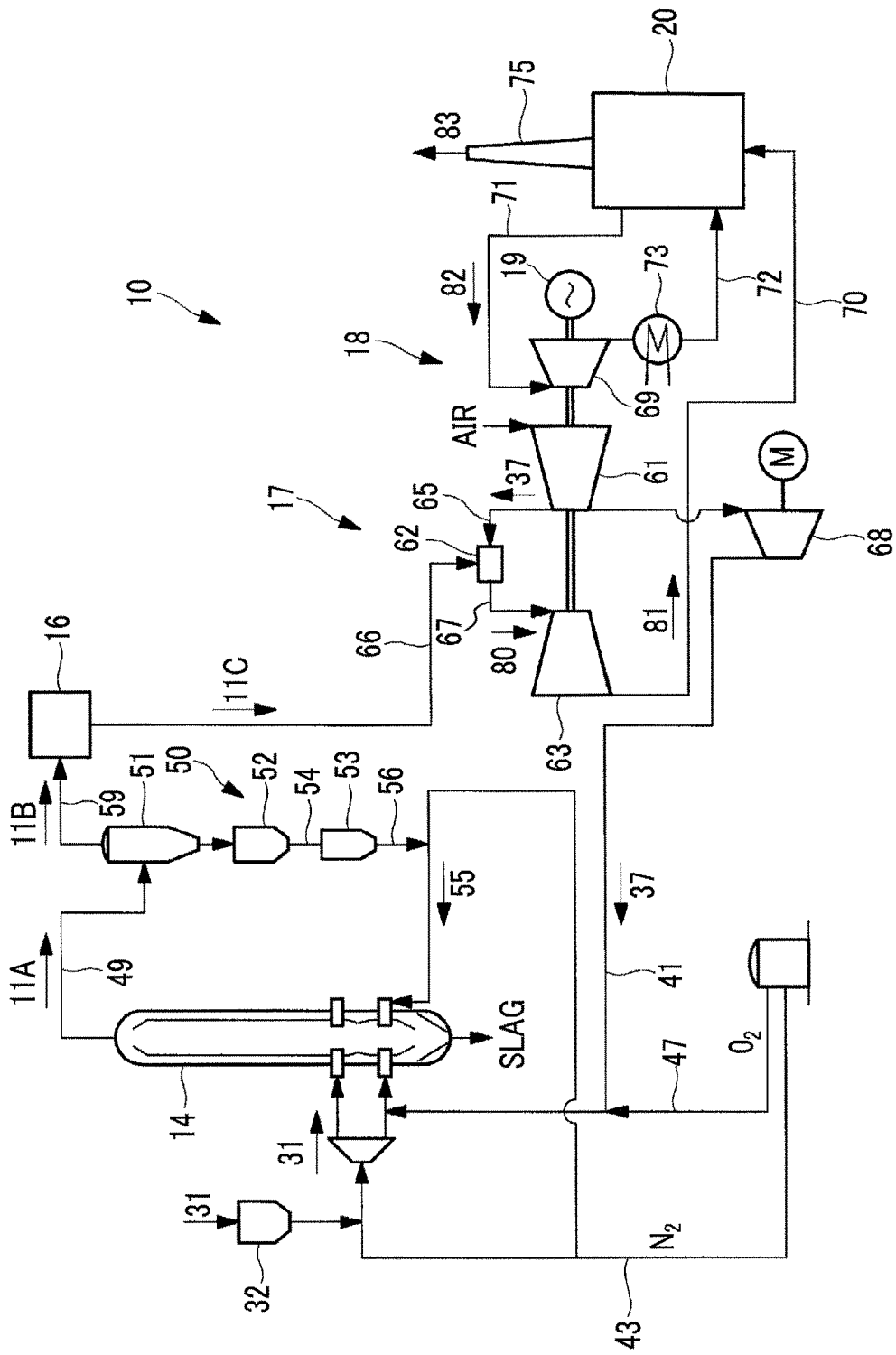
FIG. 1 is a schematic configuration diagram showing a coal gasification combined power generation system including a char feeding hopper according to a first embodiment of the present invention.

FIG. 1 shows schematic configurations of a char feeding hopper, a char recovery system, and a coal gasification combined power generation system according to the present embodiment.

As shown in FIG. 1, as main configurations, a coal gasification combined power generation system 10 includes pulverized coal feeding facility 30 which feeds pulverized coal 31 in which coal which is metallurgical coal or the like is pulverized, a coal gasifier 14 to which the pulverized coal 31 is fed and in which the fed coal 31 is gasified so as to generate product gas (combustible gas) 11A, a char recovery system 50 which recovers char 55 from the product gas 11A which is the gasified gas, a gas purification unit 16 which purifies the product gas 11B from which the char 55 is separated, a gas turbine facility 17 which combusts purified fuel gas 11C so as to drive a turbine, a steam turbine facility 18 which is operated by steam 82 generated by a heat recovery steam generator (HRSG) 20 to which exhaust gas 81 is introduced from the gas turbine facility 17, and a generator 19 which is connected to the gas turbine facility 17 and/or the steam turbine facility 18.

The present embodiment crushes original coal (for example, coal, brown coal, or the like) from an original coal bunker (not shown), and feeds the pulverized coal 31 from a coal bunker 32 to the coal gasifier 14.

The pulverized coal 31, which is fed from the coal bunker 32, can be fed to the coal gasifier 14.

That is, a compressed air feeding line 41 is connected from the gas turbine facility 17 (compressor 61) to the coal gasifier 14, and compressed air 37 which is compressed by the gas turbine facility 17 can be fed to the coal gasifier 14. A first nitrogen feeding line 43 is connected to the coal gasifier 14. In addition, an oxygen feeding line 47 is connected to the compressed air feeding line 41. In this case, nitrogen ($N_2$) is used as a transport gas of the pulverized coal 31 or the char 55, and oxygen ($O_2$) is used as an oxidizing agent.

Here, in the present embodiment, the char 55 is fed to the coal gasifier 14. However, the char 55 recovered by the char recovery system 50 mixes with the pulverized coal 31, and the mixture may be fed into the coal gasifier 14.

For example, the coal gasifier 14 is an entrained bed type gasification furnace, and in the coal gasifier 14, the pulverized coal 31, the char 55, the air (oxygen), or water vapor serving as a gasifying agent fed into the inner portion is combusted and gasified, the product gas 11A having carbon monoxide as a main component is generated, and a gasification reaction is generated with the product gas 11A as the gasifying agent. In addition, foreign matters such as molten slag, into which the pulverized coal 31 is mixed, are discharged from the coal gasifier 14.

In the present embodiment, an entrained bed gasifier is exemplified as the coal gasifier 14. However, the present invention is not limited to this, and for example, the coal gasifier 14 may be a fluidized bed gasifier or a fixed bed gasifier. In addition, in the coal gasifier 14, a gas production line 49 of the product gas 11A is provided toward the char recovery system 50, and the product gas 11A containing the char 55 can be discharged from the gas production line 49. In this case, by separately providing a gas cooler in the gas production line 49, after the product gas 11A is cooled to a predetermined temperature, the product gas 11A may be fed to the char recovery system 50.

The char recovery system 50 includes separation means 51 which separates the char 55 of the unreacted portion of the pulverized coal 31 in the product gas 11A, a char bin 52 which recovers the separated char 55, a char discharge line 54 through which the recovered char 55 is fed to the char feeding hopper 53, and a char discharge line 56 through which the char 55 is transported to the coal gasifier 14 side by the char feeding hopper 53.

The separation means 51 is configured of one or a plurality of bug filters or cyclones, and can separate the char 55 contained in the product gas 11A generated by the coal gasifier 14. In addition, the product gas 11B from which the char 55 is separated is sent to the gas purification unit 16 through a gas discharge line 59. The char feeding hopper 53 stores the char 55 which is separated from the product gas 11A by the separation means 51. In addition, the char discharge line 56 from the char feeding hopper 53 is connected to the second nitrogen feeding line 45.

The gas purification unit 16 removes impurities such as sulfur compound or nitrogen compound with respect to the product gas 11B from which the char 55 is separated from the char recovery system 50 so as to perform gas purification. In addition, the gas purification unit 16 purifies the product gas 11B from which the char 55 is separated so as to produce the flue gas 11C, and fed the purified gas to the gas turbine facility 17. In addition, in the gas purification unit 16, since sulfur ($H_2S$) is still contained in the product gas 11B from which the char 55 is separated, for example, by removing the sulfur using an amine absorbing liquid or the like, the sulfur is finally recovered as plaster so as to be effectively used.

The gas turbine facility 17 includes the compressor 61, a combustor 62, and a turbine 63, and the compressor 61 and the turbine 63 are connected to each other by a rotary shaft. A compressed air feeding line 65 from the compressor 61 is connected to the combustor 62, a flue gas feeding line 66 from the gas purification unit 16 is connected to the combustor 62, and the combustor 62 is connected to the turbine 63 through a flue gas feeding line 67. In addition, in the gas turbine facility 17, a compressed air feeding line 41 which extends from the compressor 61 to the coal gasifier 14 is provided, and a booster 68 is provided in the intermediate portion of the compressed air feeding line 41. Accordingly, in the combustor 62, the compressed air 37 from the compressor 61 and the flue gas 80 fed from the gas purification unit 16 are mixed with each other and are combusted, and it is possible to drive the generator 19 by rotating the rotary shaft using the flue gas 80 generated in the turbine 63.

The steam turbine facility 18 includes a turbine 69 which is connected to the rotary shaft in the gas turbine facility 17, and the generator 19 is connected to the base end portion of the rotary shaft. The heat recovery steam generator 20 is provided in an exhaust gas line 70 from the gas turbine facility 17 (turbine 63), and generates steam 82 by performing heat exchange between air and the high temperature exhaust gas 81. Accordingly, in the heat recovery steam generator 20, a steam feeding line 71 through which the steam 82 is fed to a portion between the heat recovery steam generator 20 and the turbine 69 of the steam turbine facility 18 is provided, a steam recovery line 72 is provided, and a condenser 73 is provide in the steam recovery line 72. Accordingly, in the steam turbine facility 18, the turbine 69 is driven by the steam 82 fed from the heat recovery steam generator 20, and it is possible to drive the generator 19 by rotating the rotary shaft.

In addition, exhaust gas 83, from which heat is recovered by the heat recovery steam generator 20, is discharged from a stack 75 to the atmosphere.

Here, an operation of the coal gasification combined power generation system 10 of the present embodiment will be described.

In the coal gasification combined power generation system 10 of the present embodiment, the pulverized coal 31 stored in the coal bunker 32 is fed to the coal gasifier 14 by nitrogen fed from the air separator 42. In addition, the char 55 recovered by the char recovery system 50 described below is fed to the coal gasifier 14 by nitrogen fed from the air separator 42. In addition, after the compressed air 37 extracted from the gas turbine facility 17 described below is boosted by the booster 68, the compressed air 37 is fed to the coal gasifier 14 through the compressed air fed line 41 along with oxygen fed from the air separator 42.

In the coal gasifier 14, the fed pulverized coal 31 and the char 55 are combusted by the compressed air (oxygen) 37, the pulverized coal 31 and the char 55 are gasified, and the product gas 11A having carbon dioxide as the main component can be generated. In addition, the product gas 11A is discharged through the gas production line 49 from the coal gasifier 14, and is sent to the char recovery system 50.

In the char recovery system 50, first, the product gas 11A is fed to the separation means 51, and the char 55 contained in the product gas 11A is separated. In addition, the product gas 11B from which the char 55 is separated is sent to the gas purification unit 16 through the gas discharge line 59. Meanwhile, the particulate char 55, which is separated from the product gas 11A, is accumulated in the char feeding hopper 53 via the char bin 52, and is returned to the coal gasifier 14 so as to be recycled.

In the product gas 11B from which the char 55 is separated by the char recovery system 50, impurities such as sulfur compound or nitrogen compound are removed by the gas purification unit 16 so as to be gas-purified, and the flue gas 11C is produced. Moreover, in the gas turbine facility 17, the compressor 61 generates the compressed air 37 and feeds the compressed air 37 to the combustor 62. In the combustor 62, the compressed air 37 fed from the compressor 61 and the flue gas 11C fed from the gas purification unit 16 are mixed with each other and are combusted so as to generate the flue gas 80, and the turbine 63 is driven by the flue gas 80. Accordingly, the generator 19 is driven by the rotary shaft and electricity can be generated.

Moreover, the exhaust gas 81 discharged from the turbine 63 in the gas turbine facility 17 undergoes heat exchange with air in the heat recovery steam generator 20 so as to generate the steam 82, and the generated steam 82 is fed to the steam turbine facility 18. In the steam turbine facility 18, the turbine 69 is driven by the steam 82 fed from the heat recovery steam generator 20, the generator 19 is driven by the rotary shaft, and electricity can be generated.

Thereafter, the exhaust gas 83 exhausted from the heat recovery steam generator 20 is discharged from the stack 75 to the atmosphere.

Figure 2:
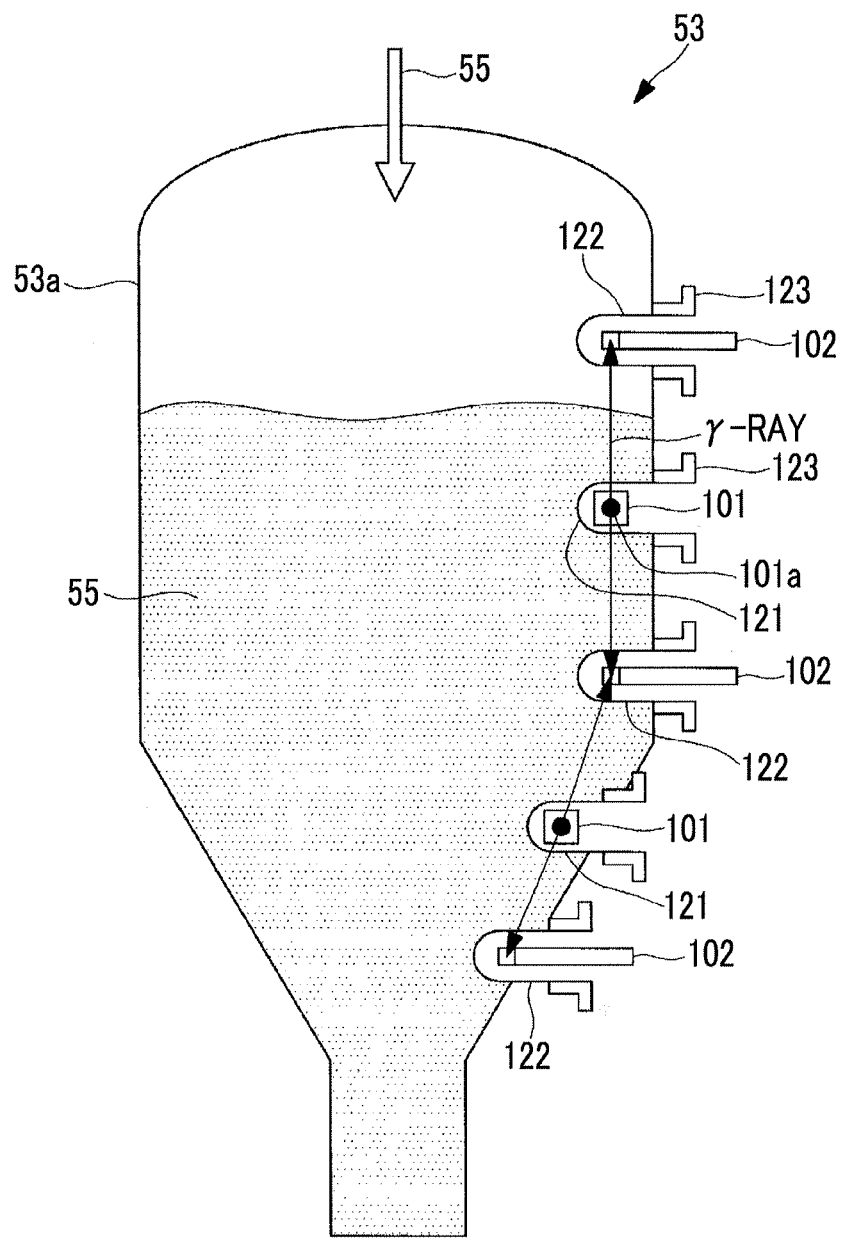
FIG. 2 is a longitudinal sectional view showing the char feeding hopper according to the first embodiment of the present invention.

FIG. 2 is a sectional view of the char feeding hopper according to the present embodiment.

As shown in FIG. 2, the char feeding hopper 53 includes a char feeding hopper body 53a through which the separated char 55 is fed to the coal gasifier 14 side, first casing tubes 121 which are inserted from a side wall of the char feeding hopper body 53a, radiation source sections 101 which are provided inside the first casing tubes 121 and emit γ-rays to the inner portion of the char feeding hopper body 53a, second casing tubes 122 which are provided up and down in vertical axis directions of the first casing tubes 121 and are inserted from the side wall of the char feeding hopper body 53a, and γ-ray detectors 102 which are provided inside the second casing tubes 122 and detect the emitted γ-rays.

In addition, the first and second casing tubes 121 and the 122 are installed by tube bases 123 which are provided on the side wall of the char feeding hopper body 53a.

Figure 3:
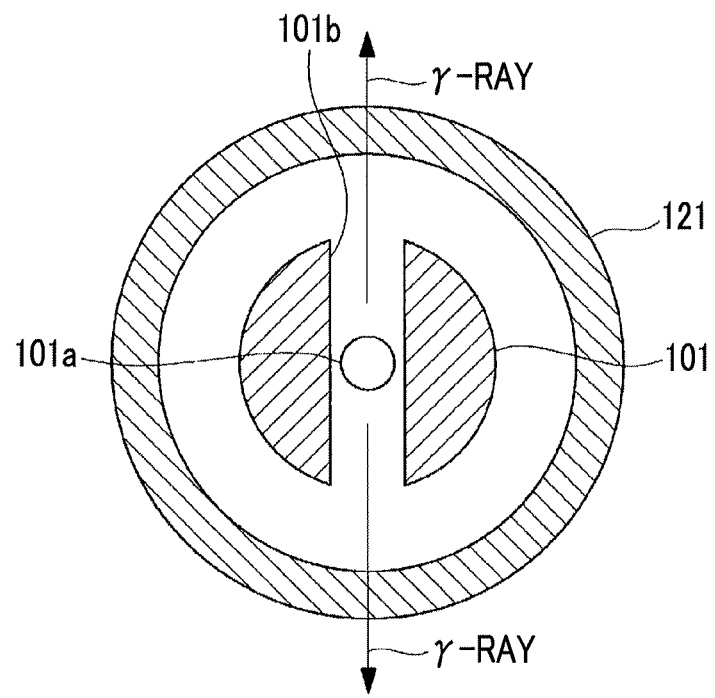
FIG. 3 is a cross-sectional view of a casing tube having a radiation source section according to the first embodiment of the present invention.

As shown in FIG. 3, the radiation source section 101 having a radiation source 101a is inserted into the first casing tube 121.

Figure 4:
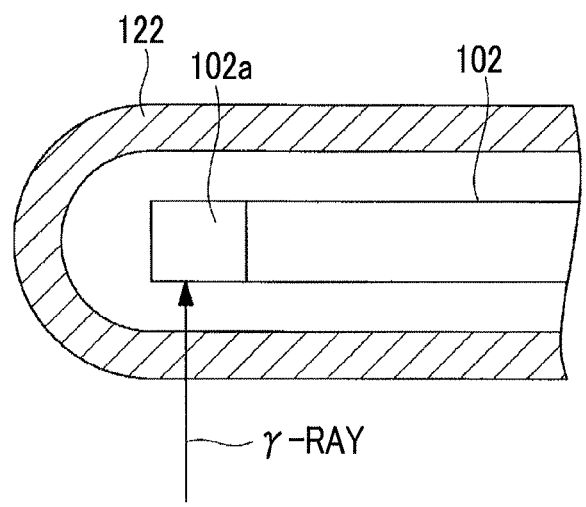
FIG. 4 is a longitudinal sectional view showing the tip portion of the casing tube having a γ-ray detector according to the first embodiment of the present invention.

As shown FIG. 4, the γ-ray detector 102 having a detection unit 102a is inserted into the second casing tube 122.

The plurality of first and second casing tubes 121 and 122 in which pressure is shield are installed in the vertical axis direction inside the char feeding hopper body 53a, and the radiation source section 101 having the radiation source 101a emitting the γ-ray and the γ-ray detector 102 having the detection unit 102a detecting the γ-ray are respectively installed as level gauges for detecting a power layer level in the casing tubes 121 and 122.

The plurality of radiation source sections 101 and γ-ray detectors 102 may be installed according to the level range (height) of the char 55.

That is, when the level range is small, one set of the radiation source section 101 and the γ-ray detector 102 may be configured.

When the level range is large, as shown in FIG. 3, the radiation source section 101 having discharging holes up and down may be installed (in this case, radiation hole 101b which opens only in the vertical axis direction about the radiation source 101a is formed), or, as shown in FIG. 2, the plurality of radiation source sections 101 and γ-ray detectors 102 may be provided such as a case in which the radiation source sections 101 are further provided above and below a configuration including the γ-ray detector 102, the radiation source section (having discharging holes up and down) 101, and the γ-ray detector 102.

The plurality of tube bases 123 are vertically installed on the side surface of the container of the char feeding hopper body 53a, the first and second casing tubes 121 and 122 are provided on the tube bases 123, the plurality of level gauges including the radiation source sections 101 and the γ-ray detectors 102 provided inside the casing tubes 121 and 122 are provided, and it is possible to measure the levels of the char 55 in a non-contact manner.

If the γ-rays are emitted from the radiation source section 101 toward the γ-ray detector 102 and the γ-rays emit the γ-ray detector 102, the γ-rays are detected as electric signals. In this case, when the char 55 exists between the radiation source section 101 and the γ-ray detector 102, densities of transmission of the γ-rays are different according to the amount of the char 55. The powder layer level of the char 55 is measured using the density differences of the transmission of the γ-rays according to the amount of the char 55.

Figure 5:
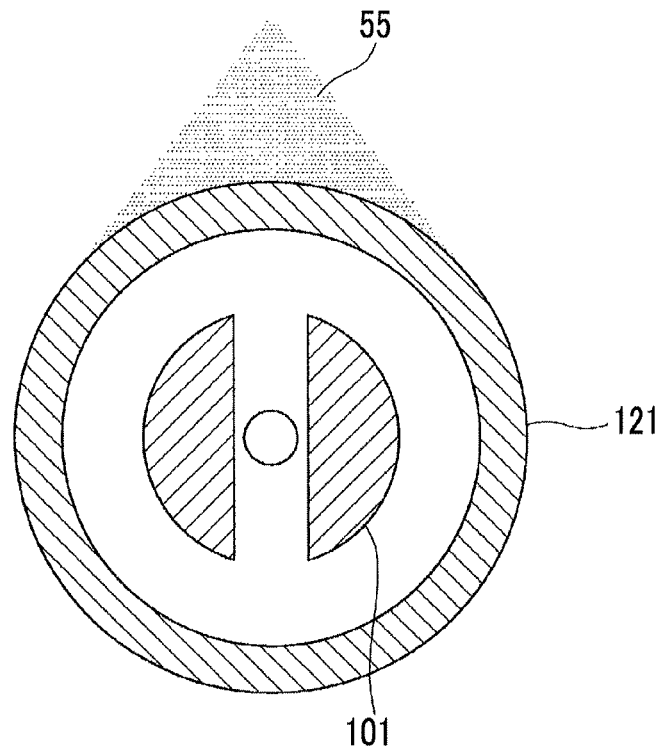
FIG. 5 is a cross-sectional view showing a state where char is accumulated on the upper portion of the casing tube having a cross-section of a tubular shape.

Here, for example, in a case where the first casing tube 121 has a tubular shape, when the char 55 stored in the char feeding hopper 53 moves from the upper portion of the first casing tube 121 toward the lower portion, as shown in FIG. 5, the char 55 may be accumulated on the upper portion of the first casing tube 121. In this case, even when the amount of the char 55 is small in actual, a case in which it is erroneously detected that the char 55 is stored to the upper portion of the first casing tube 121 or the like occurs, and the accumulated char 55 inhibits a correct volume measurement. Accordingly, it is not possible to correctly grasp the amount of the retained char, a fixed feeding amount of the char 55 is not performed, and a stable operation is difficult. In addition, stopping of the coal gasification combined power generation system 10 may occur.

Figure 6A:
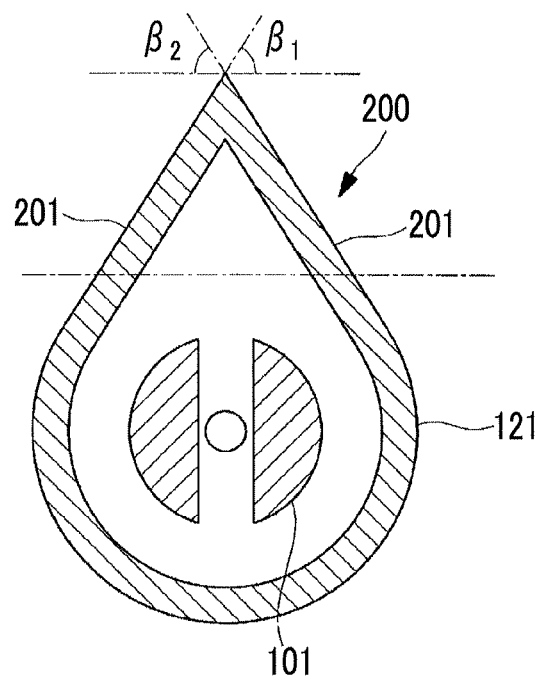
FIG. 6A shows the cross-section of the casing tube according to the first embodiment of the present invention, and is a cross-sectional view showing a state where a taper section is perpendicular.
Figure 6B:
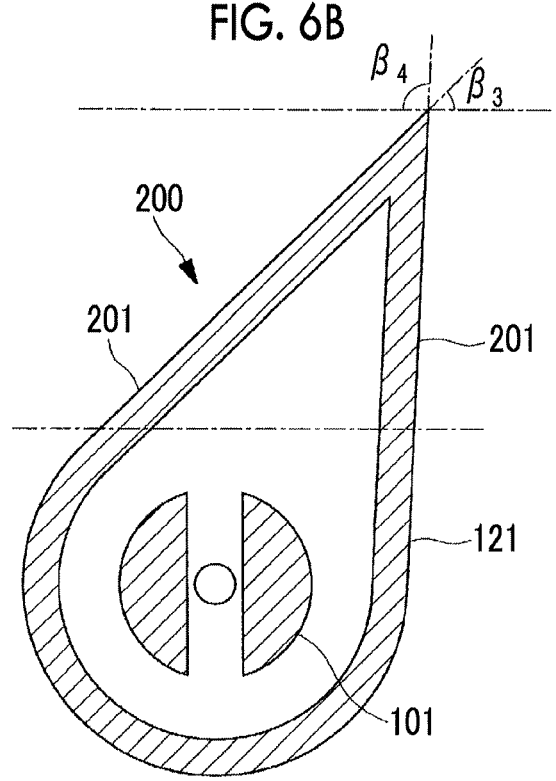
FIG. 6B shows the cross-section of the casing tube according to the first embodiment of the present invention, and is a modification example of FIG. 6A and a cross-sectional view showing a state where a taper section is eccentric.

Accordingly, in the present embodiment, as shown in FIGS. 6A and 6B, the cross-sections of the casing tubes 121 and 122 are formed such that tapered sections 200 having apex angles are provided on the upper edges.

More specifically, each of the casing tubes 121 and 122 is formed in a shape which, in a virtual cylinder, has two tangential planes in a circumferential direction of the cylinder (side surfaces 201 of the tapered section 200 in FIGS. 6A and 6B), and combines the tapered section 200 in which an intersection line of the tangential lines is positioned above the apex of the cylinder with the intersection line as a side and the above-described virtual cylinder.

FIG. 6A shows a case where the apex angle of the tapered section 200 of the first casing tube 121 is positioned in the vertical axis direction of the center of the cylinder when the first casing tube 121 is cylindrical, that is, a case where the tapered section 200 is perpendicular, and FIG. 6B is a modification example of FIG. 6A, and shows a case where the apex angle of the tapered section of the first casing tube 121 is positioned in directions other than the vertical axis direction of the center of the cylinder when the first casing tube 121 is cylindrical, that is, a case where the apex angle is deviated from the vertical axis direction.

Angles $\beta_1$, $\beta_2$, $\beta_3$, and $\beta_4$ between the horizontal surface and the side surfaces 201 of the tapered sections 200 of FIGS. 6A and 6B are equal to or greater than repose angles, and the apex of the tapered section 200 is positioned above the apex of the cylinder when the first casing tube 121 is cylindrical.

In addition, the shapes of FIGS. 6A and 6B are provided so as to be continued to at least the portions of the casing tubes 121 and 122 inserted into the char feeding hopper 53.

By forming the first casing tube 121 in the above-described shape, since the apex angle is provided on the upper edge of the first casing tube 121, the char 55 positioned on the upper portion of the first casing tube 121 does not stay on the upper edge of the first casing tube 121, and since the first casing tube 121 has the tapered shape, the char 55 cannot stay on the first casing tube 121 and slides down.

As described above, according to the char feeding hopper, the char recovery system, and the coal gasification combined power generation system of the present embodiment, since it is possible to prevent the char 55 from accumulating on the tapered sections 200 of the casing tubes 121 and 122 in advance, the measurement is not interrupted by the char 55, a correct volume measurement can be performed, and it is continuously possible to perform a stable operation.

In addition, since the angle between the horizontal surface and the side surface 201 of the tapered section 200 is equal to or greater than the repose angle when the char 55 is accumulated, it is possible to prevent the char 55 from accumulating on the side surface 201 of the tapered section 200.

The descriptions of the present embodiment are limited to the first casing tube 121. However, the first casing tube 121 may be the second casing tube 122.

[Second Embodiment]

Hereinafter, a second embodiment of the present invention will be described with reference to FIG. 7.

In the above-described first embodiment, in order to prevent the accumulation of the char 55, the casing tubes 121 and 122 are formed so as to have the tapered sections in which the apex angles are provided on the upper edges. However, in the present embodiment, a char removing portion is provided. Since matters other than the above-described matter are the same as the first embodiment, descriptions thereof are omitted.

Figure 7:
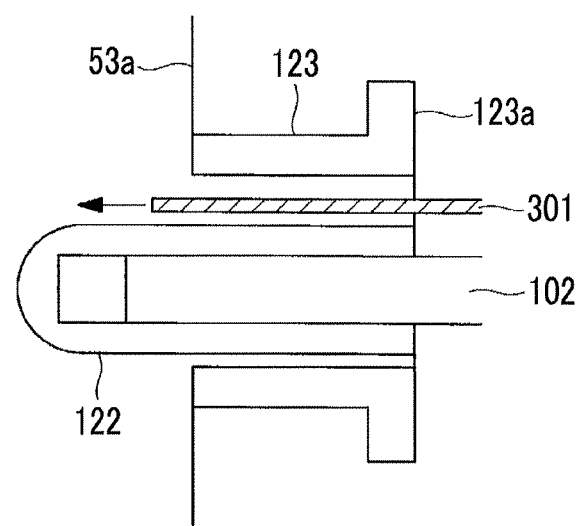
FIG. 7 is a partially enlarged longitudinal sectional view of a casing tube according to a second embodiment of the present invention and a portion in the vicinity of the casing tube.

FIG. 7 is a schematic configuration diagram showing cross-sections of a casing tube according to the present embodiment and a portion in the vicinity of the casing tube. A nozzle 301 is provided above the apex of the cylinder of the second casing tube 122 between the second casing tube 122 and the tube base 123. One end of the nozzle 301 is connected to the inert gas system of the coal gasification combined power generation system 10, and an injection port of the other end extends to the inner portion of the char feeding hopper body 53a. Here, in the present embodiment, the insert gas is nitrogen ($N_2$).

Pressurized nitrogen is injected from the nozzle 301 to the upper portion of the cylinder of the second casing tube 122. Due to the injected pressurized nitrogen, the char 55 on the upper portion of the second casing tube 122 is blown off.

[Modification Example of Second Embodiment]

Figure 8:
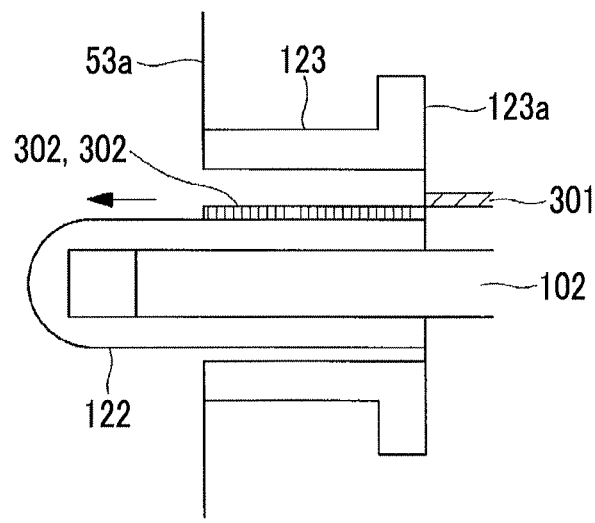
FIG. 8 is a partially enlarged longitudinal sectional view of a casing tube according to a modification example of the second embodiment of the present invention and a portion in the vicinity of the casing tube.

Hereinafter, a modification example of the second embodiment of the present invention will be described with reference to FIG. 8.

In the second embodiment, the nozzle 301 which is the char removing portion extends to the inner portion of the char feeding hopper body 53a between the second casing tube 122 and the tube base 123. However, in the present modification example, the position of the nozzle 301 is different that of the second embodiment. Specifically, as shown in FIG. 8, the nozzle 301 includes the injection port on the base end portion 123a of the tube base 123, that is, an end portion opposite to the inner portion side of the char feeding hopper 53.

In addition, two guides 302 which are erected from the circumference of the second casing tube 122 are provided so as to be aligned in parallel on the circumference of the second casing tube 122. The two guides 302 are provided so as to form a channel, through which the insert gas injected from the injection port of the nozzle 301 is introduced into the inner portion of the char feeding hopper body 53a, between the two guides 302. In addition, each guide 302 is installed in a direction along the center axis of the second casing tube 122 from the base end portion 123a of the tube base 123 to the char feeding hopper body 53a.

The inert gas such as nitrogen is injected from the nozzle 301 to the upper portion of the cylinder of the second casing tube 122. The injected inert gas flows to the inner portion of the char feeding hopper body 53a along the portion between the guides 302, and blows off the char 55 on the upper portion of the second casing tube 122.

As described above, according to the char feeding hoppers, the char recovery systems, and the coal gasification combined power generation systems of the present embodiment and the modification example, since it is possible to remove the char 55 accumulated on the upper portions of the casing tubes 121 and 122 by the inert gas injected from the nozzle 301, it is possible to prevent the char 55 from accumulating on the casing tubes 121 and 122. Accordingly, a correct volume measurement is performed, and it is possible to continuously perform a stable operation.

In addition, even when the char 55 is accumulated, it is possible to remove the char 55 by the inert gas injected from the nozzle 301.

In addition, since the inert gas used in the coal gasification combined power generation system 10 is injected from the nozzle 301, it is possible to remove the char 55 accumulated on the casing tubes 121 and 122 by the injection of the inert gas. In addition, since the inert gas used in the coal gasification combined power generation system 10, for example, nitrogen used as the transport gas of the pulverized coal 31 or the char 55 is used, it is not necessary to provide new equipment for injecting gas, and the gas can be easily introduced. Moreover, preferably, in order to stably feed the char 55 to the inner portion of the char feeding hopper 53, the inner portion is pressurized. However, since the insert gas, particularly, nitrogen is injected to the inner portion, it is possible to prevent accumulation of the char 55 and to pressurize the inner portion.

In addition, according to the char feeding hopper, the char recovery system, and the coal gasification combined power generation system of the present modification example, even when the nozzle 301 cannot be not provided since the portion between the second casing tube 122 and the tube base 123 is narrow, and the nozzle 301 is provided on the base end portion 123a of the tube base 123, by providing the guides 302 on the second casing tube 122, it is possible to obtain the effects as those of the second embodiment.

In addition, the descriptions of the present embodiment are limited to the second casing tube 122. However, the second casing tube 122 may be the first casing tube 121.

[Third Embodiment]

Hereinafter, a third embodiment of the present invention will be described.

In the above-described second embodiment, the nozzle 301 which injects the inert gas is provided above each of the casing tubes 121 and 122 in order to prevent the accumulation of the char 55. However, in the present embodiment, the casing tubes 121 and 122 are configured so as to be rotatable. Since matters other than the above-described matter are the same as the second embodiment, descriptions thereof are omitted.

For example, when each of the casing tubes 121 and 122 has a tubular shape, in a case where the char 55 stored in the char feeding hopper 53 moves the upper portion of each of the casing tubes 121 and 122 to the lower portion, as shown in FIG. 5, the char 55 may be accumulated.

Figure 9:
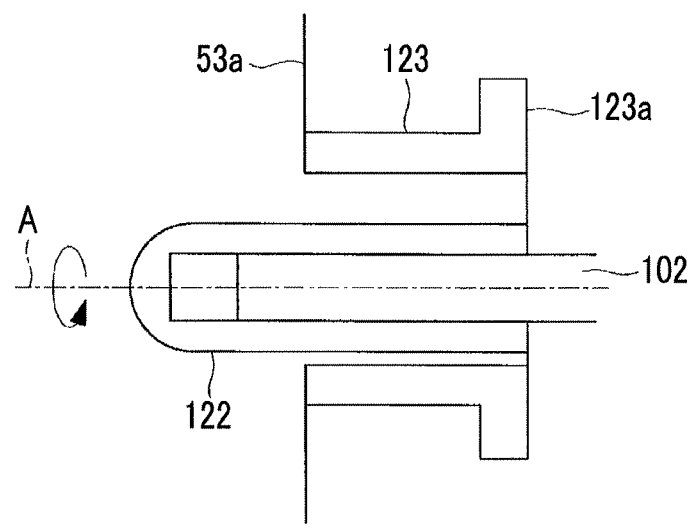
FIG. 9 is a partially enlarged longitudinal sectional view of a casing tube according to a third embodiment of the present invention and a portion in the vicinity of the casing tube.

Accordingly, in the present embodiment, as shown in FIG. 9, the second casing tube 122 can rotate around a center axis A.

By rotating the second casing tube 122 always, rotating the second casing tube 122 regularly, or rotating the second casing tube 122 before the measurement is performed, the char 55 is not accumulated on the second casing tube 122 and slides down. In order to rotate the second casing tube 122, an operator manually may rotate the second casing tube 122, a device or a control device for rotating the second casing tube 122 may be separately provide, or the like.

As described above, according to the char feeding hopper, the char recovery system, and the coal gasification combined power generation system of the present embodiment, since each of the casing tubes 121 and 122 can rotate around the center axis A, even when the char 55 is accumulated on the upper portion of each of the casing tubes 121 and 122, it is possible to make the char accumulated on the upper portions slide down so as to remove the char by rotating the casing tubes 121 and 122, and it is possible to prevent the char 55 from accumulating on the upper portions of the casing tubes 121 and 122. Accordingly, a correct volume measurement is performed, and it is possible to continuously perform a stable operation.

In addition, even when the char 55 is accumulated, it is possible to remove the char 55 by rotating the casing tubes 121 and 122.

The descriptions of the present embodiment are limited to the second casing tube 122. However, the second casing tube 122 may be the first casing tube 121.

REFERENCE SIGNS LIST

10: coal gasification combined power generation system
14: coal gasifier
50: char recovery system
53: char feeding hopper
53a: char feeding hopper body
55: char
101: radiation source section
102: γ-ray detector
121: first casing tube
122: second casing tube
123: tube base
301: nozzle (char removing portion)
302: guide

The invention claimed is:

1. A char feeding hopper, comprising:
a char feeding hopper body which supplies separated char to a gasifier side;
at least two casing tubes which are inserted from a side wall of the char feeding hopper body and are provided so as to be aligned with each other in a vertical axis direction;
a radiation source section which is provided within one of at least the two casing tubes and emits γ-rays to an inner portion of the char feeding hopper body;
a γ-ray detector which is provided within the other of at least the two casing tubes and detects the emitted γ-rays;
a nozzle which includes an injection hole on a base end portion opposite to the inner portion side of the char feeding hopper body in a tube base provided on the side wall of the char feeding hopper body;
two guides which are provided on the circumference of one of the casing tubes and are provided so as to be aligned in parallel on the circumference of the one of the casing tubes in a direction along the center axis of the one of the casing tubes, and which form, between the two guides, a channel through which inert gas injected from the nozzle is introduced into the inner portion of the char feeding hopper body,
wherein the inert gas injected from the nozzle flows along a portion between the two guides, and blows off the char accumulated on the upper portion of the casing tubes.

2. A char recovery system comprising:
the char feeding hopper according to claim 1; and
a char discharge line connected to the char feeding hopper according to claim 1.

3. A coal gasification combined power generation system comprising:
the char recovery system according to claim 2; and
a generator operable to generate electricity in connection with the separated char provided to the gasifier side.

* * * * *